United States Patent [19]

Bryant

[11] 4,173,751
[45] Nov. 6, 1979

[54] STOP LAMP MONITOR CIRCUIT

[75] Inventor: Stanley Bryant, Taree, Australia

[73] Assignee: Bryant Manufacturing Pty. Limited, Taree, Australia

[21] Appl. No.: 886,398

[22] Filed: Mar. 14, 1978

[51] Int. Cl.² .............................................. B60Q 1/26
[52] U.S. Cl. ....................................... 340/80; 340/642
[58] Field of Search .................... 340/80, 85, 642, 638

[56] References Cited

U.S. PATENT DOCUMENTS

| | | | |
|---|---|---|---|
| 2,486,599 | 11/1949 | Hollins | 340/80 |
| 3,423,745 | 1/1969 | Williams | 340/642 |
| 3,514,751 | 5/1970 | Pascente | 340/642 |

Primary Examiner—Donald J. Yusko
Attorney, Agent, or Firm—Emory L. Groff, Jr.

[57] ABSTRACT

The invention relates to a stop signal monitor circuit for use in conjunction with a vehicle stop lamp system wherein a pair of stop lamps is connectable across the vehicle's electricity supply through a fuse and a respective pair of switch contacts closable in response to the application of vehicle's brake, and wherein a pair of pilot lamps give indication of an open circuit condition existing in either the fuse or one or both of the stop lamps in accordance with the respective operation of the vehicle's brake and the vehicle's ignition switch.

11 Claims, 2 Drawing Figures

STOP LAMP MONITOR CIRCUIT

This invention relates to a stop signal monitor circuit for incorporation into a vehicle stop lamp system to provide a dashboard indication of any malfunction which may possibly occur in the fallible components throughout the system.

It is well known that a vehicle stop lamp system basically comprises a pair of stop lamps mounted at each side of the rear of the vehicle, the lamps being simultaneously operable in response to the closure of a switch consequent upon the application of the vehicle's brake. This switch closes a circuit between the stop lamps and the vehicle's electricity supply and may either be operated mechanically by the brake pedal or handbrake lever or, alternatively, in response to an increase of pressure in the vehicle's hydraulic braking system. A fuse is generally interposed between the brake responsive switch and the vehicle's electricity supply.

The most common fault which may be expected to occur in a vehicle stop lamp system is an open circuit condition exhibited by either of the stop lamps or by the fuse. Systems have already been devised to give a dashboard indication of a failure occurring in a stop lamp circuit. However, such systems do not take account of individual component failure indication and, after a fault has been generally indicated, necessitate further fault location either by the use of appropriate instruments or by the trial and error component replacement technique. Such procedures can be inconvenient in the event of a stop lamp circuit failure, which is usually regarded as an emergency incident.

The present invention seeks to overcome the aforementioned disadvantages of the prior art by providing a stop signal monitor circuit which gives instantaneous and individual dashboard indication of the failure of either a stop lamp or a fuse within a vehicle's stop lamp system.

According to one aspect of the present invention, there is provided a stop signal monitor circuit for use in conjunction with a vehicle stop lamp system wherein a pair of stop lamps is connected across the vehicle's electricity supply through a fuse and a respective pair of switch contacts closable in response to the application of the vehicle's brake, said system including a pair of pilot lamps connected at one side each to a respective one of said pair of stop lamps and connected together at the other side alternatively to the earthed or unearthed side of the vehicle's electricity supply through a series interconnection of first and second switch means, said system further including a pair of resistors connected at one side each to a respective one of said points of connection of said pilot lamps and said stop lamps and connected together at the other side to the point of interconnection of said first and second switch means, said first switch means being operative in response to the application of the vehicle's brake and said second switch means being operative in response to the vehicle's ignition system to provide for an indication by said pair of pilot lamps of an open circuit condition occurring in either of said stop lamps or said fuse.

According to a further aspect of the present invention, there is also provided a stop signal monitor circuit as aforesaid wherein said pair of pilot lamps is replaced by a pair of light emitting diodes interconnected at one side in front to back relationship and connected at the other side to each respective side of a shunt diode, the point of connection of one of said light emitting diodes and said shunt diode being connected to the point of connection of one of said resistors and a respective one of said stop lamps and the point of connection of the other of said light emitting diodes and said shunt diode being connected through a series diode to the point of connection of the other of said resistors and the other of said stop lamps, the point of interconnection of said pair of light emitting diodes being further connected to said first switch means.

The present invention will now be described in detail with reference to the accompanying drawings in which.

Figure 1:
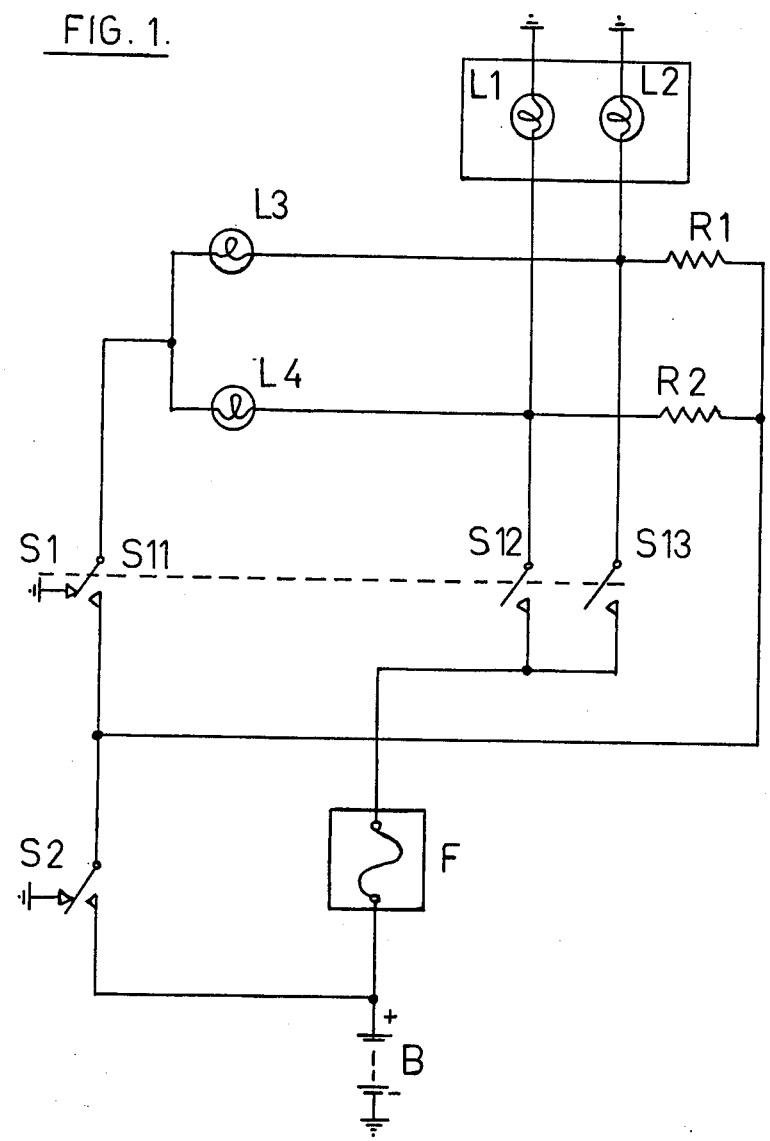
FIG. 1 is a circuit diagram showing one preferred embodiment of the present invention.

Referring now to FIG. 1, a pair of stop lamps L1 and L2 are suitably mounted at the rear of a vehicle and are each connected at one side to the vehicle earth system. The stop lamps L1, L2 are connected at the other side through respective switch contacts S12, S13 and a fuse F to the vehicle's electricity supply (shown as battery B). Switch contacts S12, S13 are normally open and are closable with the operation of switch S1 which is responsive to the operation of the vehicle's brake. Coincidentally, switch S1 also causes switch contact S11 to perform a change over function. Switch contacts S11, S12 and S13 are shown in their normal positions when the vehicle's brake is not being applied.

Switch contact S2 is a change over contact functional with the vehicle's ignition switch and is shown in its normal position with the ignition turned off. Pilot lamps L3 and L4 are suitably mounted on the vehicle's dash panel and serve to give indication of a particular fault occurring in the vehicle's stop lamp system.

With the ignition turned off and the brake applied, switch contact S2 remains in its normal position and switch contacts S11, S12 and S13 are thrown away from their normal positions to their operated positions. This provides a closed circuit from the vehicle's electricity supply B through fuse F, switch contacts S12, S13, pilot lamps L3, L4, switch contact S11, switch contact S2 and the vehicle's earth system. In this way, a simple pre-check is provided to ensure that an open circuit condition does not exist in either of pilot lamps L3, L4 or fuse F.

With the ignition turned on and the brake not applied, a closed circuit is established from the vehicle's electricity supply B through switch contact S2, resistors R2, R1, respective stop lamps L1, L2 and the vehicle's earth system. The values of resistors R2, R1 are chosen such that the current which flows through each of stop lamps L1, L2 is insufficient to cause the stop lamps to illuminate. In other words, the internal resistance of each of stop lamps L1, L2 is very much smaller than the value of each of resistors R2, R1. If either of stop lamps L1, L2 are blown, a circuit is established through either of pilot lamps L4, L3 respectively and through switch contact S11 to earth. Because the minimum illumination current of pilot lamps L4, L3 is very much smaller than that of stop lamps L1, L2, the current which is allowed to flow by either of resistors R2, R1 through respective pilot lamps L4, L3 is sufficient to cause illumination of the pilot lamps, and individual indication of an open circuit condition existing in either of stop lamps L1, L2 is thus provided.

With the ignition turned on and the brake applied, a closed circuit is once again established from the vehicle's electricity supply B through fuse F, switch contacts S12, S13, respective stop lamps L1, L2 and the vehicle's earth system. In this instance, there is no indication given by either of pilot lamps L4, L3 of an open circuit condition occurring in either of stop lamps L1, L2. However if an open circuit condition occurs in fuse F, a closed circuit is established from the vehicle's electricity supply B through switch contact S2, switch contact S11, pilot lamps L4, L3 respective stop lamps L1, L2 and the vehicle's earth system. If fuse F and one of stop lamps L1, L2 exhibits an open circuit condition, a closed circuit is still maintained through the other stop lamp and indication of a blown fuse is still given by a respective one of pilot lamps L4, L3. With regard to this function, the internal resistance of each of pilot lamps L4, L3 is large enough to ensure that the current which flows through respective stop lamps L1, L2 is insufficient to cause their illumination.

Figure 2:
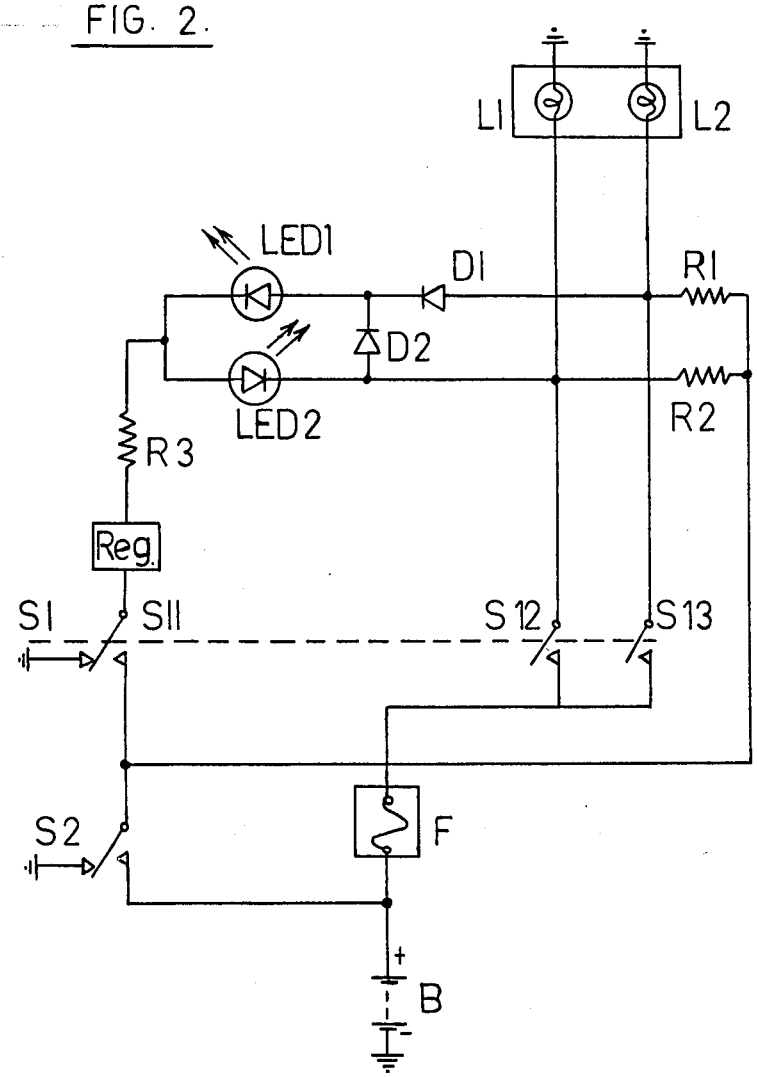
FIG. 2 is a circuit diagram showing a further preferred embodiment of the present invention.

The circuit diagram of FIG. 2 shows a similar arrangement to that of FIG. 1 with the pilot lamps L4, L3 replaced by a pair of light emitting diodes LED2, LED1 and a pair of diodes D2, D1. A regulator and resistor R3 are preferably connected between switch contact S11 and the interconnection of light emitting diodes LED2, LED1 in order to limit the amount of current which is allowed to flow through each of the light emitting diodes.

With the ignition switched off and the brake applied, a closed circuit is established from the vehicle's electricity supply B through fuse F, switch contacts S12, S13, respective diodes D2, D1, light emitting diode LED1, resistor R3, the regulator, switch contact S11, switch contact S2 and the vehicle's earth system. This provides a pre-check indication by light emitting diode LED1 that the circuit is properly functional. With the ignition switched on and the brake not applied, indication of an open circuit condition exhibited by either of stop lamps L1, L2 is again given by light emitting diode LED1. Thirdly, with the ignition switched on and the brake applied, indication of an open circuit condition exhibited by fuse F is given when current flows through light emitting diode LED2 and stop lamp L1. It should be noted that the polarities shown for the connection of light emitting diodes LED1, LED2 and diodes D2, D1 in FIG. 2 are applicable only to a negative earth system. Obviously, these polarities must be reversed in the case of a positive earth system.

A tabulation of the particular indications given of a respective fault condition, using both the circuits of FIG. 1 and FIG. 2, is shown below.

|  | Ignition off Brake on (Pre-check) | Ignition on Brake off | Ignition on Brake on |  |
|---|---|---|---|---|
| L1 blown | L3, L4 | L4 |  | F |
| L2 blown | L3, L4 | L3 |  | I G U |
| F blown |  |  | L3, L4 | R E 1 |
| L1 blown | LED1 | LED1 |  | F |
| L2 blown | LED1 | LED1 |  | I G U |
| F blown |  |  | LED2 | R E 2 |

The foregoing is a description of only two preferred embodiments of the present invention, and modifications which may be seen to be within the general knowledge of a person skilled in the art may be applied to these embodiments without departing from the overall scope of the basic inventive concept. Purely by example, the switch contacts S11 and S2 may be constituted by auxiliary contacts of the motor vehicle's existing brake switch and ignition switch respectively, or may be additional contacts incorporated into these switches particularly for the purpose of applying the present invention.

Obviously, the present invention may be adapted to a system wherein there is more than one pair of stop lamps. Such a system may be found on a motor vehicle exhibiting a large bank of stop lamps or a motor vehicle and trailer combination. In such a case, adaptation of the present invention would simply involve duplication of the circuits disclosed in this specification.

I claim:

1. A stop signal monitor circuit for use in conjunction with a vehicle stop lamp system wherein a pair of stop lamps is connected across the vehicle's electricity supply through a fuse and a respective pair of switch contacts closable in response to the application of the vehicle's brake, said system including a pair of pilot lamps connected at one side each to a respective one of said pair of stop lamps and connected together at the other side alternatively to the earthed or unearthed side of the vehicle's electricity supply through a series interconnection of first and second switch means, said system further including a pair of resistors connected at one side each to a respective one of said points of connection of said pilot lamps and said stop lamps and connected together at the other side to the point of interconnection of said first and second switch means, said first switch means being operative in response to the application of the vehicle's brake and said second switch means being operative in response to the vehicle's ignition system to provide for an indication by said pair of pilot lamps of an open circuit condition occurring in either of said stop lamps or said fuse.

2. A stop signal monitor circuit as claimed in claim 1, wherein the minimum illumination current of each of said pair of pilot lamps is substantially less than that of each of said pair of stop lamps and the value of each of said pair of resistors is such as to permit only sufficient current flow to cause illumination of a respective one of said pair of pilot lamps.

3. A stop signal monitor circuit as claimed in claim 2, wherein said first switch means is constituted by a set of auxiliary switch contacts coincidentally operable with said respective pair of switch contacts for connecting said pair of stop lamps to the vehicle's electricity supply and said second switch means is constituted by a set of auxiliary switch contacts coincidentally operable with the vehicle's ignition switch.

4. A stop signal monitor circuit as claimed in claim 3, wherein said first and said second switch means is each constituted by a set of single pole, change over switch contacts.

5. A stop signal monitor circuit as claimed in claim 4, wherein the vehicle's electricity supply is a battery.

6. A stop signal monitor circuit as claimed in claim 1, wherein said pair of pilot lamps is replaced by a pair of light emitting diodes interconnected at one side in front to back relationship and connected at the other side to each respective side of a shunt diode, the point of connection of one of said light emitting diodes and said shunt diode being connected to the point of connection of one of said resistors and a respective one of said stop lamps and the point of connection of the other of said light emitting diodes and said shunt diode being connected through a series diode to the point of connection of the other of said resistors and the other of said stop lamps, the point of interconnection of said pair of light emitting diodes being further connected to said first switch means.

7. A stop signal monitor circuit as claimed in claim 6, wherein a regulator is connected between the point of interconnection of said pair of light emitting diodes and said first switch means to limit the flow of current through said pair of light emitting diodes.

8. A stop signal monitor circuit as claimed in claim 7, wherein the minimum illumination current of each of said pair of light emitting diodes is substantially less than that of each of said pair of stop lamps and the value of each of said pair of resistors is such as to permit only sufficient current flow to cause illumination of a respective one of said pair of light emitting diodes.

9. A stop signal monitor circuit as claimed in claim 8, wherein said first switch means is constituted by a set of auxiliary switch contacts coincidentally operable with said respective pair of switch contacts for connecting said pair of stop lamps to the vehicle's electricity supply and said second switch means is constituted by a set of auxiliary switch contacts coincidentally operable with the vehicle's ignition switch.

10. A stop signal monitor circuit as claimed in claim 9, wherein said first and said second switch means is each constituted by a set of single pole, change over switch contacts.

11. A stop signal monitor circuit as claimed in claim 10, wherein the vehicle's electricity supply is a battery.

* * * * *